(12) United States Patent
Marom et al.

(10) Patent No.: US 10,031,542 B2
(45) Date of Patent: Jul. 24, 2018

(54) SYSTEM AND METHOD FOR ON-DEMAND ELECTRICAL POWER

(71) Applicant: Nova Lumos Ltd., Beit-YeHoshua (IL)

(72) Inventors: Nir Marom, Tzur-Moshe (IL); Davidi Vortman, Tzur-Moshe (IL)

(73) Assignee: Nova Lumos Ltd., Netanya (IL)

( * ) Notice: Subject to any disclaimer, the term of this patent is extended or adjusted under 35 U.S.C. 154(b) by 333 days.

(21) Appl. No.: 14/593,298

(22) Filed: Jan. 9, 2015

(65) Prior Publication Data
US 2015/0120072 A1 Apr. 30, 2015

Related U.S. Application Data

(63) Continuation of application No. PCT/IL2013/050587, filed on Jul. 10, 2013.

(60) Provisional application No. 61/670,619, filed on Jul. 12, 2012.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05F 1/66* | (2006.01) |
| *G06Q 50/06* | (2012.01) |
| *G05B 15/02* | (2006.01) |

(52) U.S. Cl.
CPC ............ *G05F 1/66* (2013.01); *G05B 15/02* (2013.01); *G06Q 50/06* (2013.01)

(58) Field of Classification Search
CPC ............ G05F 1/66; G05B 15/02; G06Q 50/06
USPC ................ 700/287–297; 307/64, 66
See application file for complete search history.

(56) References Cited

U.S. PATENT DOCUMENTS

| | | | |
|---|---|---|---|
| 6,191,501 B1 | 2/2001 | Bos | |
| 2003/0034757 A1* | 2/2003 | Woodnorth | H01M 10/425 320/132 |
| 2004/0119685 A1 | 6/2004 | Harries et al. | |
| 2005/0222784 A1 | 10/2005 | Tuff et al. | |
| 2006/0276938 A1* | 12/2006 | Miller | G06Q 50/06 700/295 |
| 2007/0043478 A1 | 2/2007 | Ehlers et al. | |
| 2008/0315829 A1 | 12/2008 | Jones et al. | |

(Continued)

FOREIGN PATENT DOCUMENTS

| | | |
|---|---|---|
| JP | 2005056049 A | 3/2005 |
| KR | 20080018630 A | 2/2008 |

OTHER PUBLICATIONS

Patent Cooperation Treaty International Search Report and the Written Opinion for PCT/IL2013/050587, ISA/US, Alexandria, VA, dated Jan. 10, 2014.

(Continued)

*Primary Examiner* — Ziaul Karim

(74) *Attorney, Agent, or Firm* — M&B IP Analysts, LLC

(57) ABSTRACT

A system and method for system for providing on-demand renewable energy are provided. The system comprises at least one power unit for converting environmental energy into electrical power, wherein the electrical power is drawn from the at least one power unit; and a regulator for controlling an amount of the electrical power drawn from the at least one power unit based on an authorization rule, wherein the authorization rule is checked upon each attempt to draw the electrical power from the at least one power unit.

13 Claims, 3 Drawing Sheets

(56) References Cited

U.S. PATENT DOCUMENTS

| | | | |
|---|---|---|---|
| 2010/0181957 A1* | 7/2010 | Goeltner | B60L 8/003 320/101 |
| 2010/0223180 A1* | 9/2010 | Kremen | G06Q 10/10 705/40 |
| 2010/0241375 A1* | 9/2010 | Kumar | H01L 31/02021 702/62 |
| 2010/0262312 A1 | 10/2010 | Kubota et al. | |
| 2011/0114079 A1* | 5/2011 | Heckendorn | G01S 3/7861 126/574 |
| 2011/0234149 A1* | 9/2011 | Hoshi | B60L 8/003 320/101 |
| 2011/0258093 A1 | 10/2011 | Antoci | |
| 2012/0035871 A1 | 2/2012 | Cofta et al. | |
| 2012/0143383 A1* | 6/2012 | Cooperrider | H04Q 9/00 700/295 |
| 2012/0197449 A1* | 8/2012 | Sanders | G05B 15/02 700/291 |
| 2012/0229709 A1* | 9/2012 | Heald | B81C 1/00269 348/739 |
| 2012/0259735 A1 | 10/2012 | Taylor et al. | |
| 2012/0293000 A1* | 11/2012 | Fan | H02J 1/102 307/64 |
| 2013/0169226 A1* | 7/2013 | Read | B60L 11/16 320/109 |
| 2013/0253973 A1* | 9/2013 | Ishibashi | G06Q 10/06314 705/7.24 |
| 2014/0183957 A1* | 7/2014 | Duchesneau | F01K 13/006 307/64 |

OTHER PUBLICATIONS

The International Search Report and the Written Opinion of the International Searching Authority for PCT/US15/30505, ISA/RU, Moscow, Russia, dated Aug. 20, 2015.

First Office Action dated Jun. 28, 2017 for Chinese Patent Application No. 201380043354.8 from State Intellectual Property Office of the P.R.C., China.

The 2nd Office Action for Chinese Patent Application No. 201380043354.8 from State Intellectual Property Office of the P.R.C. dated Mar. 5, 2018.

* cited by examiner

SYSTEM AND METHOD FOR ON-DEMAND ELECTRICAL POWER

CROSS-REFERENCE TO RELATED APPLICATIONS

This application is a continuation application of PCT Application No. PCT/IL2013/050587 filed on Jul. 10, 2013, which claims the benefit of Israeli Patent Application No. 61/670,619 filed on Jul. 12, 2012. All of the applications referenced above are herein incorporated by reference.

TECHNICAL FIELD

The present disclosure relates generally to systems for providing off-grid renewable electrical power on demand, and more particularly to a system that enables a user to purchase off-grid renewable electrical power based on user while preventing electricity or system theft.

BACKGROUND

Renewable energy, and in particular energy generated by solar photovoltaic panels or wind/water turbines, can be particularly suitable for developing countries since in such countries transmission and distribution of energy generated from fossil fuels can be difficult and expensive.

Advances in technology and reduction in manufacturing costs make solar energy an attractive alternative to energy generated from fossil fuels. Over the 2008-2011 period, the price of photovoltaic modules per MW has fallen by over 60%.

Approximately 1.5 billion people around the world do not have access to grid electricity (off-grid). An additional 1 billion are connected to unreliable grids. Even though these people are typically poor, they pay far more for lighting than people in western countries because they use inefficient energy sources (kerosene) which are far costlier than grid electricity or environmentally-produced energy.

Renewable energy projects in many developing countries have demonstrated that renewable energy can directly contribute to economic development and poverty alleviation by providing the energy needed for creating businesses and employment as well as providing energy for cooking, space heating and cooling, lighting etc. In addition, renewable energy can also contribute to education, by providing electricity to schools as well as home based education.

Although the case for renewable energy in developing countries is compelling, there remains a problem of how to finance deployment of renewable energy systems such as photovoltaic panels in areas where the population cannot afford to purchase such systems or finance the costs typically associated with deployment of such systems, and especially when such systems are prone to theft, as they are easily detached.

Thus, it would be highly advantageous to have a system which can provide pay-per-use renewable energy without the financial burden typically associated with deployment of such systems from the consumer side, while providing the necessary security for the operator so that system components and/or electricity are not stolen.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a system for providing on-demand renewable energy. The system comprises at least one power unit for converting environmental energy into electrical power, wherein the electrical power is drawn from the at least one power unit; and a regulator for controlling an amount of the electrical power drawn from the at least one power unit based on an authorization rule, wherein the authorization rule is checked upon each attempt to draw the electrical power from the at least one power unit.

Certain embodiments disclosed herein also include a method of providing on-demand renewable energy. The method comprises checking if at least an authorization rule is satisfied; and controlling by a regulator an amount of the electrical power drawn from the at least one power unit based on the satisfied authorization rule, wherein the authorization rule is checked upon each attempt to draw the electrical power from the at least one power unit.

Certain embodiments disclosed herein further include a system for providing on-demand renewable energy. The system comprises at least one power unit for converting environmental energy into electrical power; and an anti-theft unit for preventing unauthorized use of the system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
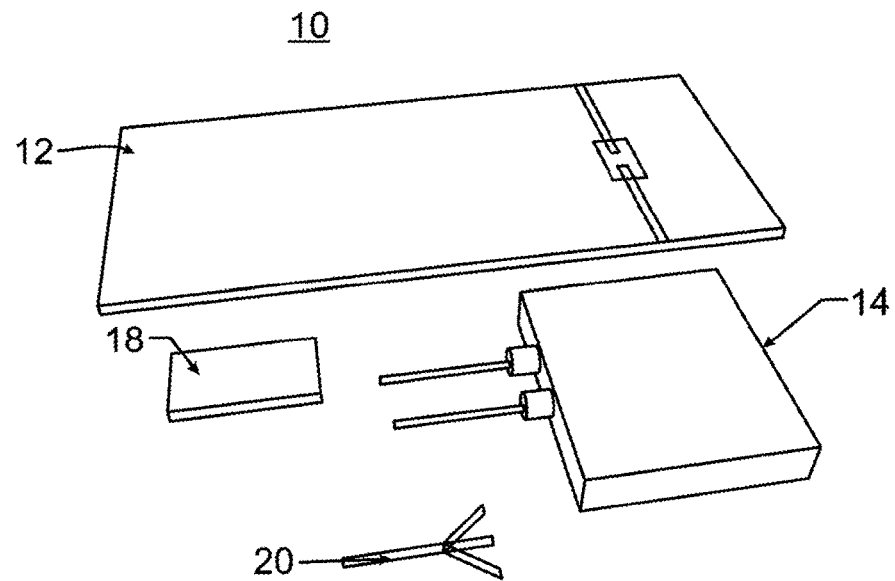
FIG. 1 is a schematic diagram illustrating components of a system for providing on-demand electrical power according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments include of a system which can be used to provide on-demand electricity on a pay-per-use payment model and as such is particularly advantageous for use in off-grid regions of the world.

Although renewable energy systems are a promising source of energy for developing countries, deployment of renewable energy systems such as photovoltaic panels in rural areas can be costly and beyond the financial capabilities of individuals. This is one reason why villagers still use kerosene lamps for heating and cooking at a cost of approximately $0.40-$0.50 per day.

Financing schemes are currently difficult to deploy. This is mainly due to the fact that the systems used for electricity generation, as well as the electricity produced by these systems, can be easily stolen.

In one embodiment a renewable energy system that is specifically suitable for providing electricity on a pay-per-use basis is provide. This allows to provide off-grid individuals with a low-cost and renewable source of energy while also providing the operator with the security that the equipment and/or electricity generated therefrom are not stolen, without a need for an upfront investment in infrastructure.

Thus, according an embodiment, there is provided a system for providing renewable energy to a subject. As used herein, the term "renewable energy" refers to energy produced by renewable resources, specifically environmental energy sources such as the sun (solar energy converted to heat or electricity), water (hydroelectric or wave generators), wind, and the earth (geothermal energy).

The system includes at least one power unit for converting environmental energy into electrical power. The power unit can include a solar panel for converting solar energy to heat, a photovoltaic (PV) panel for converting solar energy to electricity, a hydroelectric generator for converting energy from flow of water (river flow, waterfall) to electricity, a wave generator for converting wave energy to electricity, and/or a wind turbine for converting wind energy to electricity. The system can include any number of power units deployed over land, on buildings, on trees, and in or over water. The power unit can include internal theft and tamper-resistant mechanisms, which are controlled by the regulator or a separate unit (as described hereunder).

A typical set up of photovoltaic configuration of the present system can include one or more photovoltaic panels such as, for example, mono-crystalline, polycrystalline or thin film panels. The present system can also include an electrical power storage unit (e.g., a capacitor or a battery) for storing electrical power produced by the power unit. Examples of storage units that can be used with the present invention include, but are not limited to, lead-acid, NiMh and Lithium-ion batteries, electrical capacitors, and flow cells.

The present system also includes a regulator for controlling an amount of electrical power drawn from the power unit or from the electrical power storage unit based on authorization rules. Such authorization rules can be related to, but are not limited to, purchases of electrical power by the subject (pay-per-use, pre or post-paid) and system theft (reported theft by system owner or suspicion based on internal rules such as system location).

As is further described in detail herein below, the regulator enables pay-per-use provisions of electricity while also optionally providing communications (wired or wireless) and/or tamper-resistant mechanisms. The regulator can limit the electrical energy (current) that can be drawn from the power unit or from the electrical power storage unit by a user based on a kilowatt-hour (KWh) or time purchase either prior to or following use. In the latter case, the regulator can provide the requested electrical energy (based on time or cost) and request payment following use, with further provisions of energy depending on receipt of payment for the initial provision.

Purchase can be made via a credit card, debit card, cellular telephone (via a mobile payment platform such as SMS, near field communication, and so on), or by buying pre-paid cards with codes to input into the system or the like. Payment can be made via a user interface integrated with the system (e.g., a credit and/or debit card reader, a Near Field communication module, and so on) or it can be made to a central server communicating with the present system via wireless communication (e.g., a communications network based satellite, a cellular or IP communication, and so on).

The regulator also provides the following functions: it ensures that electricity can only be drawn from the power unit or electrical power storage unit based on the purchase rules (pre or post payment); it renders the system inoperable (such that electricity cannot be drawn out) if tampered with or moved (e.g., if the system is stolen); it provides location-based information that can be used to protect from theft; it can provide the system operator with monitoring capabilities on production and use; it can provide internet connectivity; it can provide Internet Protocol television (IPTV); and it can allow individuals to sell purchased electricity to others.

Several configurations of the power unit(s) and regulator can be deployed in rural or urban areas. A single power unit and regulator can be integrated into a single housing and deployed as a small home unit. Alternatively, several power units can be electrically wired to a single regulator (local or remote) and used to provide power to a larger home, a school, or a village. A third configuration includes a power unit or a plurality of power units which are deployed in a multi-house configuration, in which the master system can feed multiple clients. A fourth configuration includes a master system (power units and regulator) which allows resale of power generated by one client to other clients.

A more detailed description of the present system is provided hereinbelow with reference to the embodiment shown in FIGS. 1-4.

Referring now to the drawings, FIG. 1 illustrates one embodiment of a system 10 for providing on-demand electrical power according to an embodiment. System 10 includes a photovoltaic panel power unit 12 (an array or several arrays of PV cells) which is connected to a regulator 14 for controlling power output from the power unit 12 and/or from an optional storage unit (not shown), wherein such a connection can be encrypted to increase security. System 10 also optionally includes a storage unit 18 (e.g., a Lithium-ion battery) and an antenna 20 for enabling wireless communication with system 10.

Figure 2:
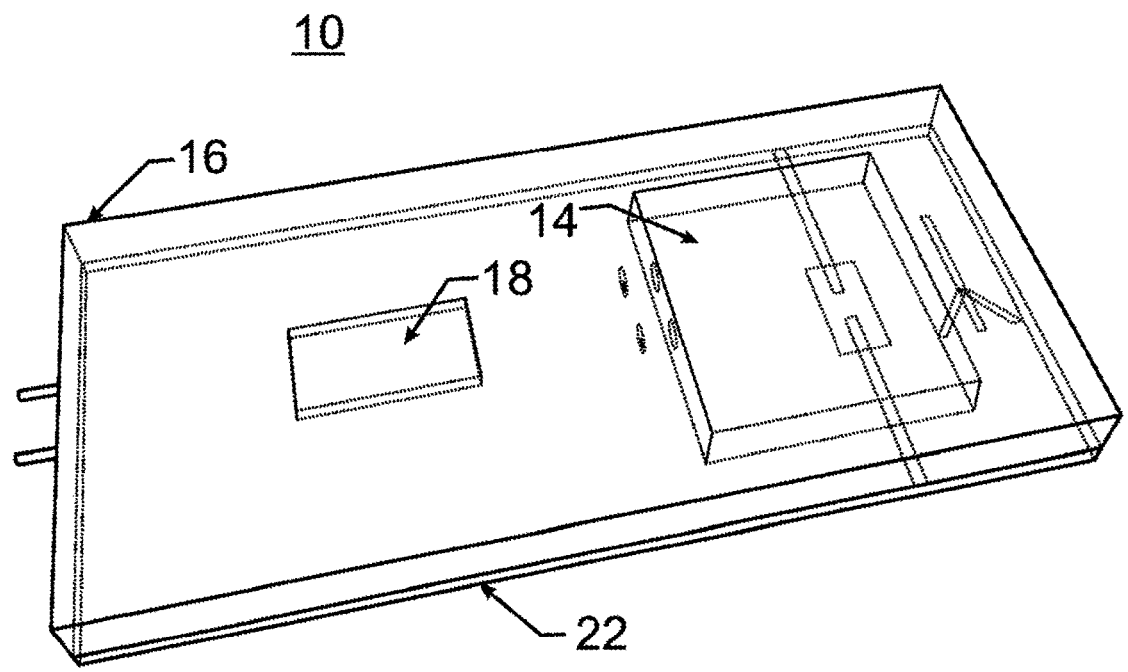
FIG. 2 is a schematic diagram illustrating a single-housing system for providing on-demand electrical power according to an embodiment.
Figure 3:
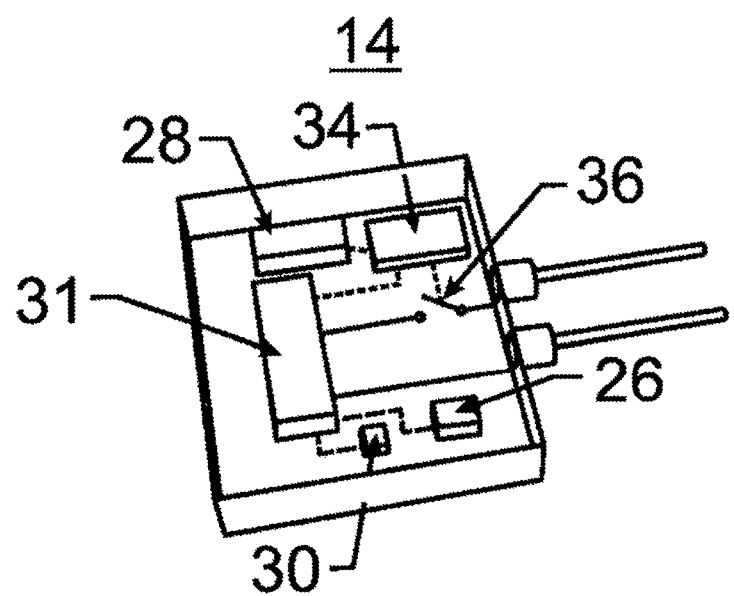
FIG. 3 is a schematic diagram of a photovoltaic power unit connected to a regulator according to an embodiment.
Figure 4:
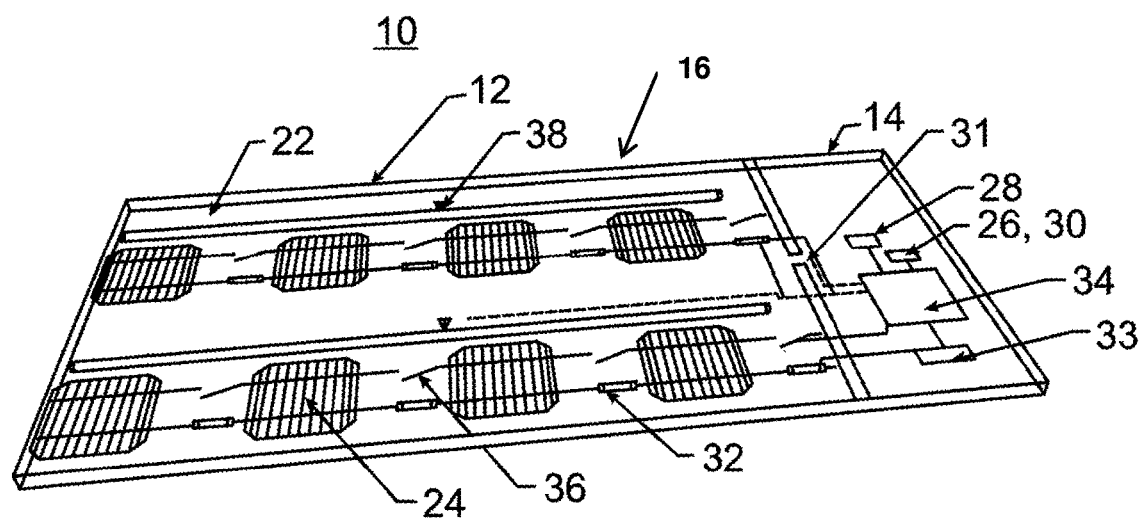
FIG. 4 is a schematic diagram of an anti-theft mechanism integrated into a photovoltaic panel according to an embodiment.

The single-panel power unit 12 is shown in FIGS. 1, 2 and 4. It will be understood, however, that alternative configurations of the system 10 which include several PV panels and one or more regulators (co-integrated or not) are also envisaged herein.

The components described above can be integrated into a single housing 16 (FIG. 2) which includes a square or rectangular frame and a sub-frame assembly co-fabricated with the frame or attached thereto and configured to support the components describe above. Alternatively, these components can be separately housed and interconnected via wires.

As is shown in FIG. 4, housing 16 can further include a front transparent panel 22 (glass or polymer) for covering and protecting PV cells 24 of power unit 12 from the environment and from misuse or abuse.

System 10 can further include a global positioning system (GPS) unit 26; a communication module 28 (connected to antenna 20) for satellite, cellular, or internet communication; an accelerometer/gyroscope 30; and/or proximity sensors (not shown) (e.g. sensors that identify physical proximity between power unit 12 and regulator 14). These components can be integrated into a single system on a chip (SoC) which includes GPS, cellular and WiFi radio, as well as accelerometers, a gyroscope, and the like. GPS unit 26 (as well as the accelerometer/gyroscope 30) functions can be used to prevent abuse of system 10 by, for example, limiting power provision from power unit 12 only to a predetermined geographical location (set by the operator), by detecting unauthorized moving or tampering of system 10 as is further described hereinbelow, or by triggering audio and light alarms implemented inside housing 16.

A user interface can be mounted on housing 16 or provided as a separately housed unit connected to regulator 14 via wired or wireless communication. The user interface can include a payment module (e.g., a card slot or NF communication module) and a button/display for selecting time, KWh, or amount of payment for pre-purchase.

It will be appreciated that the functions of the user interface can also be provided via a smartphone running a dedicated application for accepting payment and communicating with regulator 14 (via BlueTooth, WiFi, and the like) or via a centralized server which is in communication with regulator 14 through communication module 28. In the latter case, power can be (pre-) purchased by communicating with the server via SMS, a web interface, or the like.

Housing 16 can also include mounting hardware for mounting on a platform, a roof, a tree (position sensors like GPS and accelerometers need the ability to compensate for installation instability by adjusting tolerances to trigger theft or misuse situations), and the like.

System 10 can include protection mechanisms for preventing theft or misuse. Such mechanisms can be integrated into power unit 12 or regulator 14. Although such a mechanism is preferably deployed along with the pay-per-use functions described herein, they can also be separately integrated into a power unit to prevent theft of system 10 or theft of electricity therefrom.

Protection mechanisms can include physical barriers such as plastic and metal coverings, self-destruct mechanisms (e.g. breakage of wafers, glass covers, rupturable paint capsules in a PV panel 38, or breakable drive units in wind turbines), and/or electronic barriers such as fuses 32 and/or normally open switches (secure relays) for disconnect 36 or normally closed switches for short circuit (integrated into power unit 12 and/or regulator 14), as well as switches that require remote command to enable operation of the PV panel.

One example of a self-destruct-mechanism can include springs trapped between the glass covers in a compressed state such that they apply an outward force on the glass covers. Any attempt to drill through the glass covers can cause the springs' outward force to shatter the glass and render the PV panel unusable. Another self-destruct mechanism can include spikes embedded in a compressible layer trapped within the glass covers. Any attempt to drill the glass covers would compress this layer and drive the spikes into the PV cells or glass covers, thereby rendering the PV panel unusable.

An example of an electronic barrier can include vibration-sensitive switches or fuses that disconnect the circuitry of PV cells 24 when activated. To assist in identification of system misuse or theft, regulator 14 of system 10 can include CPU 34 which can process signals from GPS unit 26, accelerometer/gyroscope 30, electronic connection between regulator 14, and power unit 12 (e.g., encrypted circuitry and power flow 31), or proximity sensors to identify movement of system 10 or separation of the regulator 14 from the power unit 12, and communicate such information to a central server, activate fuse 32, and/or normally open switches 36.

Physical barriers would function as the first deterrent against tempering. If, however, regulator 14 is disconnected from power unit 12, fuse(s) 32 and/or normally open switch 36 (FIGS. 3, 4) would be activated and power unit 12 would be rendered useless.

Moreover, system 10 can physically or electronically self-destruct (via local command from CPU 24 or a remote command delivered via wireless communication) when "system misuse" is identified (via accelerometer, GPS physical separation between regulator 14 and power unit 12). Misuse events are typically identified when: system 10 is reported stolen; system 10 is identified as stolen by the GPS; a movement of system 10 is identified via an accelerator or via GPS; a disconnection of wires is identified; and regulator 14 is removed from power unit 12 (wherein the removal may be identified by lack of communication, a disconnection between wires, a disconnection between proximity sensors, and so on).

The present system can be provided to an off-grid location for free or at a very significant subsidy. The system can be installed on-site or provided as a kit for self-installation. A typical single household system would cost under $200. Since this cost is oftentimes too high for an off-grid population, the end user will purchase usage rights on a pay-per-use basis at under one US dollar; payment will be processed through SMS billing or scratch cards. Such a business model allows flexibility per country and per operator. The system is not limited to a specific billing scheme and allows each distributor/operator to define the best payment scheme for each country.

For example, operator A in country B can decide to charge a small down payment and a minimum use of X days per month. Since the cost of energy today is $0.40 at a minimum per family, a similar cost is assumed. Alternatively, some users would buy the system at full cost, and would enjoy the anti-theft aspects themselves.

In addition to electrical power, the present system can also provide internet access via pay per use model or on a monthly fee basis. A user can be offered the option of purchasing internet access instead of electricity or in addition thereto. The system can also provide Television services over IP via cellular communications, satellite communication, or other form of wireless communication. The system can also support more complex billing packages, for example, getting discounted electricity in return for cell phone usage.

It is expected that during the life of this patent many relevant power units will be developed and the scope of the term power unit is intended to include all such new technologies a priori.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for providing on-demand renewable energy, comprising:
   at least one power unit for converting environmental energy into electrical power, wherein the electrical power is drawn from the at least one power unit;
   a global positioning system (GPS) unit that provides current location coordinates for the system; and
   a regulator for controlling an amount of the electrical power drawn from the at least one power unit based on an authorization rule, wherein the authorization rule is checked upon each attempt to draw the electrical power from the at least one power unit, the authorization rule being at least a misuse event requirement for detecting that the current location coordinates indicate that the system has not been moved from an authorized location; and
   wherein the system is independent from any grid in that it is not connected to any grid and is initially installed at the authorized location;
   wherein failure to meet the misuse event requirement for detecting that the current location coordinates indicate that the system has not been moved from an authorized location results in a denial of supply of electrical power by the regulator;
   wherein the authorization rule further includes a purchase requirement, the purchase requirement is at least one of: a pre-provision purchase requirement and a post-provision purchase requirement;
   wherein the regulator comprises a user interface for conducting a purchase of the electrical power; and
   wherein the regulator controls the amount of the electrical power drawn from the at least one power unit based on the purchase.

2. The system of claim 1, wherein the authorization rule further includes a further misuse event requirement.

3. The system of claim 2, wherein the system further comprises at least one of: a gyroscope, and accelerometer, and at least one proximity sensor.

4. The system of claim 1, further comprising a self-destruct mechanism, wherein the self-destruct mechanism activates upon failure to meet the misuse event requirement.

5. The system of claim 1, wherein said at least one power unit includes an array of photovoltaic cells.

6. The system of claim 1, wherein the electrical power can only be drawn from the at least one power unit through the regulator.

7. The system of claim 1, wherein the at least one power unit and the regulator are contained in a single housing.

8. The system of claim 1, wherein the at least one power unit is any one of: at least one solar panel, a wind turbine, a wave generator, and a hydroelectric generator.

9. The system of claim 1, further comprising:
   an electrical power storage unit for storing the electrical power converted by the at least one power unit.

10. The system of claim 9, wherein the electrical power storage unit is any one of: a lead-acid battery, a Nickel-metal hydride battery, a Lithium-ion battery, a flow cell, and a capacitor.

11. The system of claim 1, further comprising:
    a communication module for providing at least one of: Internet access, and a television service.

12. A method of providing on-demand renewable energy from a system that is initially installed at an authorized location, comprising:
    checking if at least an authorization rule is satisfied, the authorization rule being at least a misuse event requirement for detecting that the system has not been moved from the authorized location, wherein the authorization rule further includes a purchase requirement, the purchase requirement is at least one of: a pre-provision purchase requirement and a post-provision purchase requirement; and
    controlling by a regulator an amount of the electrical power drawn from the at least one power unit based on the satisfied authorization rule, wherein the authorization rule is checked upon each attempt to draw the electrical power from the at least one power unit;
    wherein failure to meet the misuse event requirement for detecting that the current location coordinates indicate that the system has not been moved from an authorized location results in a denial of supply of electrical power by the regulator;
    wherein the system is independent from any grid in that it is not connected to any grid;
    wherein the regulator comprises a user interface for conducting a purchase of the electrical power; and
    wherein the regulator controls the amount of the electrical power drawn from the at least one power unit based on the purchase.

13. The method of claim 12, wherein the authorization rule further includes a further misuse event requirement.

* * * * *